(12) United States Patent
Huang et al.

(10) Patent No.: US 9,411,473 B2
(45) Date of Patent: Aug. 9, 2016

(54) TOUCH DEVICE AND MANUFACTURING METHOD THEREOF

(75) Inventors: Pingping Huang, Xiamen (CN); Jia Wu, Xiamen (CN); Zhixiong Cai, Longhai (CN); Yau-Chen Jiang, Zhubei (TW)

(73) Assignee: TPK Touch Solutions (XIAMEN) Inc., Xiamen (CN)

( * ) Notice: Subject to any disclaimer, the term of this patent is extended or adjusted under 35 U.S.C. 154(b) by 374 days.

(21) Appl. No.: 13/454,067

(22) Filed: Apr. 23, 2012

(65) Prior Publication Data

US 2013/0093696 A1  Apr. 18, 2013

(30) Foreign Application Priority Data

Oct. 13, 2011  (CN) .......................... 2011 1 0317563

(51) Int. Cl.
*G06F 3/044* (2006.01)
(52) U.S. Cl.
CPC ...... *G06F 3/044* (2013.01); *G06F 2203/04103* (2013.01); *G06F 2203/04107* (2013.01); *G06F 2203/04113* (2013.01); *Y10T 29/49105* (2015.01)

(58) Field of Classification Search
CPC ....... G06F 3/044; G06F 3/041; G06F 3/0418; G06F 2203/04103; G06F 2203/04107; G06F 2203/04113
USPC ........ 345/173–178; 29/622; 178/18.01–20.01
See application file for complete search history.

(56) References Cited

U.S. PATENT DOCUMENTS

| 6,400,359 | B1 | 6/2002 | Katabami | |
| 6,738,125 | B2 * | 5/2004 | Yamada | G02F 1/13392 349/155 |
| 2011/0018560 | A1 * | 1/2011 | Kurashima | 324/679 |
| 2011/0227867 | A1 * | 9/2011 | Ogawa | G06F 3/044 345/174 |
| 2011/0267308 | A1 * | 11/2011 | Park | G06F 3/044 345/174 |

FOREIGN PATENT DOCUMENTS

| CN | 101578006 A | 11/2009 |
| CN | 102081484 A | 6/2011 |
| CN | 102214049 A | 10/2011 |
| JP | 2009169720 | 7/2009 |
| JP | 2009169720 A | 7/2009 |
| KR | 101055379 B1 | 8/2011 |
| TW | 200901013 | 1/2009 |

* cited by examiner

*Primary Examiner* — David Tung
(74) *Attorney, Agent, or Firm* — Cooper Legal Group LLC

(57) ABSTRACT

The present disclosure relates to a touch technology, especially to a touch device and a manufacturing method thereof. The touch device comprises a sensing electrode structure, a shielding layer, a plurality of peripheral connection wires and a grounding wire. The shielding layer surrounds the periphery of the sensing electrode structure. The plurality of peripheral connection wires are located under the shielding layer and electrically connected to the sensing electrode structure. The grounding wire is electrically connected to the shielding layer. Thus, in accordance with the present disclosure, the touch device can shield external interference, and the reliability for operation of the touch circuit can be improved.

17 Claims, 12 Drawing Sheets

TOUCH DEVICE AND MANUFACTURING METHOD THEREOF

This application claims the benefit of Chinese application No. 201110317553.X, filed on Oct. 13, 2011.

BACKGROUND OF THE INVENTION

1. Field of the Invention

The present disclosure relates to a touch technology, especially to a touch device and a manufacturing method thereof.

2. Description of the Related Art

Electronic devices comprise input and output device interfaces that facilitate interaction between human beings and electronic devices. Due to rapid development of electronic components, touch input device interfaces have become popular. Conventional push-button input devices are likely to be replaced by touch input devices in near future. Touch devices used for touch inputting can be classified into various types such as resistive type, capacitive type, inductive type, acoustic wave type, optical type, etc. However, while using the above-mentioned different touch devices, these touch devices are easily interfered by external signals, which may lead to misoperation.

FIG. 1 is a perspective plan view of a conventional touch circuit. As shown in FIG. 1, a conventional touch device 1 mainly comprises a sensing electrode structure 12 and peripheral connection wires 13. Area covered by the sensing electrode structure 12 is defined as a touch area and is used for sensing touch by a user. The peripheral connection wires 13 electrically connect the sensing electrode structure 12 to an external detection circuit (not shown).

When a finger (or other conductors) touches the touch device 1, the sensing electrode structure 12 of the touch device generates a change in capacitance due to the touch, and then the change in capacitance generated in the sensing electrode structure 12 is transmitted to the external detection circuit via the peripheral connection wires 13. The detection circuit can detect the change in capacitance and calculate coordinates of the location where the finger touches. However, the change in capacitance is easily interfered by external signals or other factors, which may cause abnormal change in capacitance leading to misoperation of the touch device. Especially, when a human hand holds or accidentally touches an area where the peripheral connection wires 13 of the touch device 1 are located, the peripheral connection wires 13 generate additional change in capacitance which interferes with the change in capacitance generated in the sensing electrode structure 12. The additional change in capacitance is then outputted to the external detection circuit together with the change in capacitance generated in the sensing electrode structure 12. Thus, the external detection circuit is not able to accurately detect the change in capacitance generated in the sensing electrode structure 12 or the location where the change in capacitance is generated. As shown in FIG. 2, when a finger touches point A, it is possible that the detection circuit of the conventional touch device 1 misjudges the touch location as point B due to above-mentioned or any other interference.

SUMMARY OF THE INVENTION

In view of the above-mentioned, an objective of the present disclosure is to provide a touch device that uses a shielding layer, disposed on a plurality of peripheral connection wires, and combines the shielding layer with a grounding wire to shield signal interference or other factors that may cause misoperation, thereby improving sensitivity and accuracy of the touch device.

According to the above-mentioned objective, the present disclosure provides a touch device comprising a sensing electrode structure, a shielding layer surrounding periphery of the sensing electrode structure, a plurality of peripheral connection wires located under the shielding layer and electrically connected to the sensing electrode structure, and a grounding wire electrically connected to the shielding layer.

The present disclosure further provides a method of manufacturing a touch device. The method comprises: forming a sensing electrode structure; forming a shielding layer surrounding periphery of the sensing electrode structure; forming a plurality of peripheral connection wires located under the shielding layer and electrically connected to the sensing electrode structure; and forming a grounding wire electrically connected to the shielding layer.

By means of the touch device and the manufacturing method provided in the present disclosure, signal interference can be shielded and misoperation can be avoided, improving the reliability for operation of the touch circuit.

BRIEF DESCRIPTION OF THE DRAWINGS

For those skilled in the art to understand the present disclosure, numerous embodiments and drawings described below, are for illustration purpose only and does not limit the scope of the present disclosure in any manner.

DETAILED DESCRIPTION OF THE EMBODIMENTS

Figure 1:
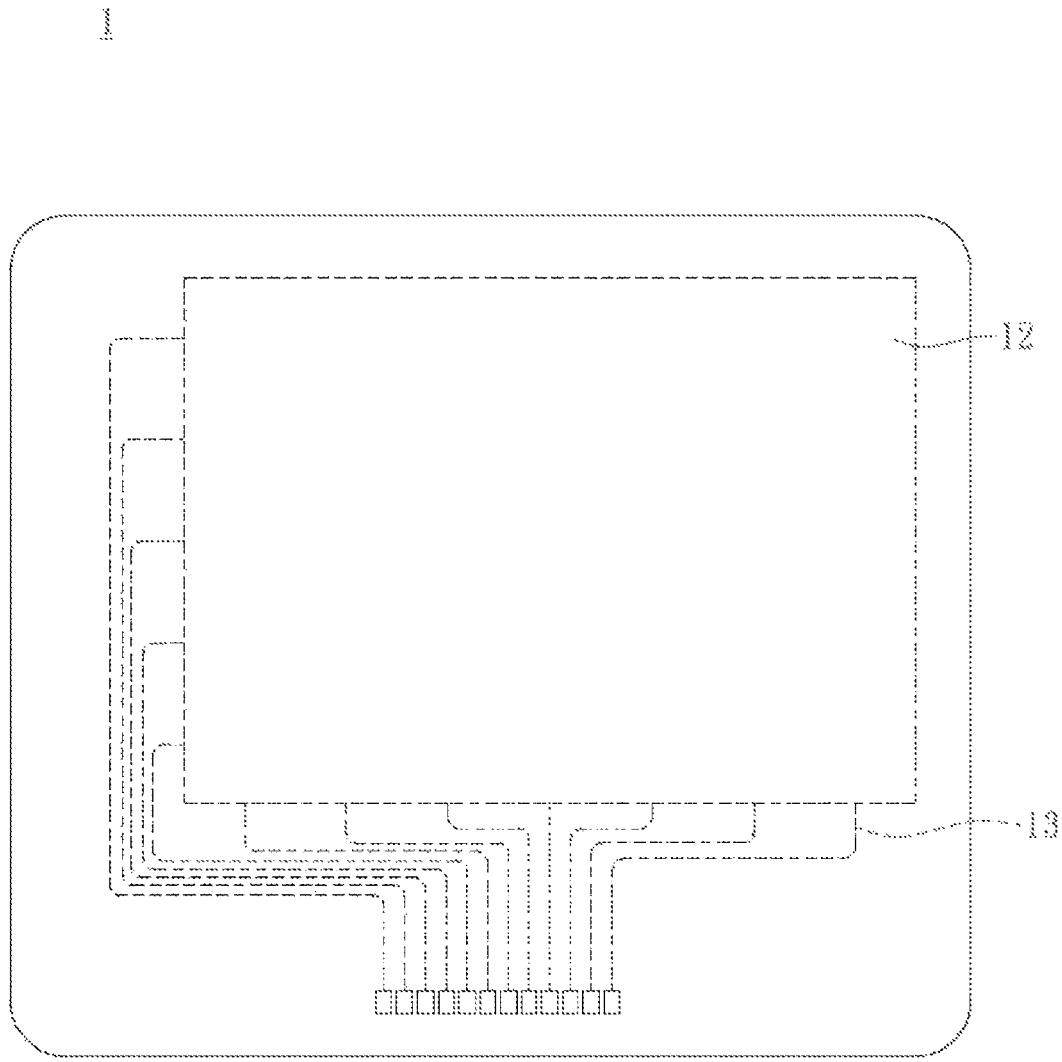
FIG. 1 is a perspective plan view of a conventional touch circuit.
Figure 2:
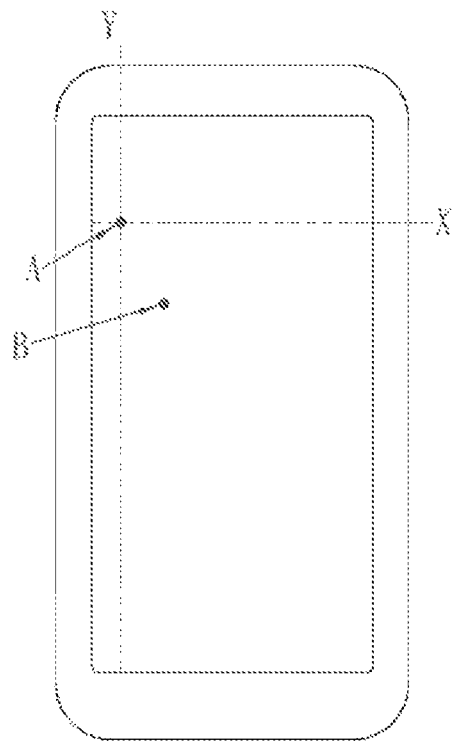
FIG. 2 is a schematic view of misoperation of a conventional touch circuit.
Figure 3:
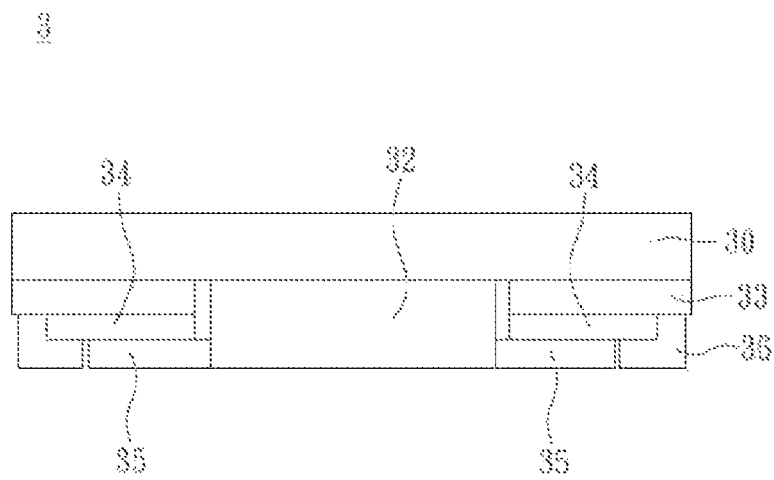
FIG. 3 is a sectional view of a touch device in accordance with an embodiment of the present disclosure.

FIG. 3 is a sectional view of a touch device in accordance with an embodiment of the present disclosure. A touch device 3 mainly comprises a substrate 30, a sensing electrode structure 32, a shielding layer 33, a plurality of peripheral connection wires 35 and a grounding wire 36. The sensing electrode structure 32 is located on a lower surface of the substrate 30, wherein area covered by the sensing electrode structure 32 is defined as a touch area and area not covered by the sensing electrode structure 32 is a surrounding area. The shielding layer 33 further covers the lower surface of the substrate 30, surrounds plural sides of the sensing electrode structure 32, and is located on the surrounding area. The plurality of peripheral connection wires 35 are located under the shielding layer 33 and electrically connected to the sensing electrode structure 32. The grounding wire 36 is located under the shielding layer 33 and electrically connected to the shielding layer 33. The grounding wire 36 surrounds the periphery of the plurality of peripheral connection wires 35. Next, a first insulation element 34 is disposed between the shielding layer 33 and the peripheral connection wires 35 such that the shielding layer 33 and the peripheral connection wires 35 are insulated from each other.

Figure 4:
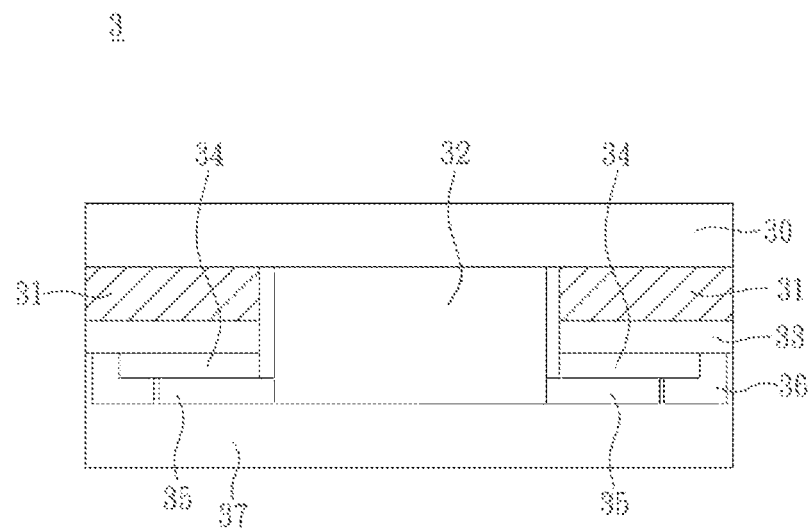
FIG. 4 is a sectional view of a touch device in accordance with another embodiment of the present disclosure.

FIG. 4 is a sectional view of a touch device in accordance with another embodiment of the present disclosure. An insulation layer 31 is disposed on surrounding area of the lower surface of the substrate 30 such that the insulation layer 31 is sandwiched between the substrate 30 and the shielding layer 33. An insulating protection layer 37 is covered on the surfaces of the sensing electrode structure 32, the peripheral connection wires 35, and the grounding wire 36 to prevent them from being damaged during the subsequent assembling process.

Figure 5:
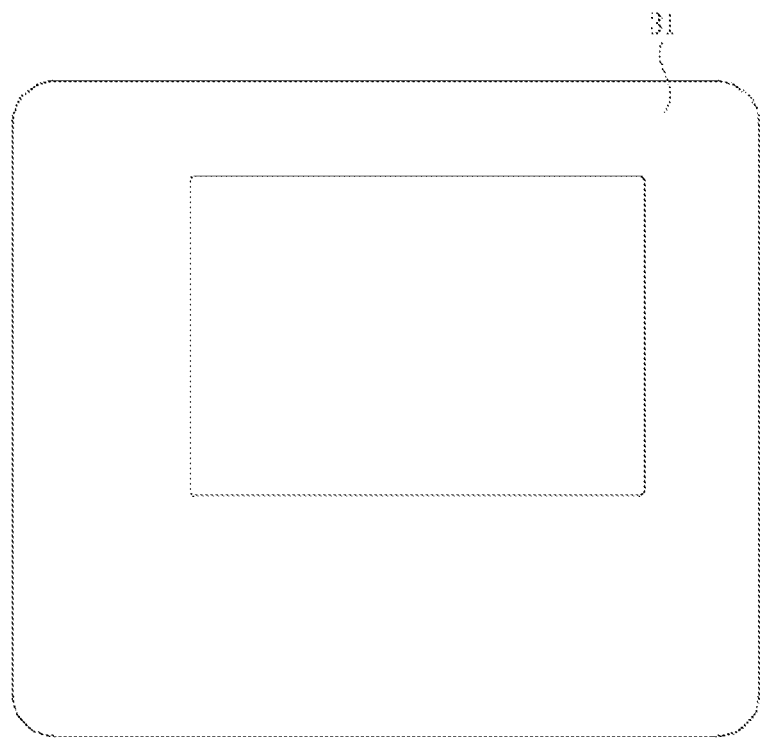
FIG. 5 is a schematic view of an insulation layer of a touch device in accordance with an embodiment of the present disclosure.

FIG. 5 is a schematic view of an insulation layer 31 of a touch device in accordance with an embodiment of the present disclosure. The insulation layer 31 is usually a black mask layer (BM layer) used for preventing light leakage and masking the peripheral connection wires 35 and the grounding wire 36. The touch device 3 of the present embodiment can be transparent or non-transparent. If the touch device 3 is transparent, the touch device 3 can be integrated with a display device. For instance, the display device (not shown) can be laminated to surface of the insulating protection layer 37 of the touch device 3, and then the touch area is also the display area of the touch display.

Further referring to FIG. 4, the shielding layer 33 is located under the insulation layer 31 and is used for surrounding plural sides of the sensing electrode structure 32. The shielding layer 33 is made of a material with good conductivity, such as a metal or an ITO (indium tin oxide), etc. Space between the shielding layer 33 and the sensing electrode structure 32 can be 0.1 cm-0.5 cm, but is not limited by the present disclosure. Space between the shielding layer 33 and the sensing electrode structure 32 can be adjusted according to the size or structure of the sensing electrode structure 32. In the present embodiment, shape of the shielding layer 33 is identical to that of the insulation layer 31, but is not limited by the present disclosure.

The peripheral connection wires 35 are electrically connected to the sensing electrode structure 32. The peripheral connection wires 35 and the grounding wire 36 are made of a material with good conductivity, such as metal or an ITO (indium tin oxide), etc. The shielding layer 33 can transmit the interference that may be received by the plural sides of the sensing electrode structure 32 to a grounding terminal (not shown) via the grounding wire 36, which can avoid misoperation of the sensing electrode structure 32.

In addition, the shielding layer 33 and the plurality of peripheral connection wires 35 are isolated by the first insulation element 34 such that the signals transmitted in the plurality of peripheral connection wires 35 are not affected by the charges or currents in the shielding layer 33. In other words, the first insulation element 34 can reduce the interference between the signals transmitted in the plurality of peripheral connection wires 35 and the charges or currents in the shielding layer 33 to an acceptable scope. Space between the shielding layer 33 and the plurality of peripheral connection wires 35 can be 0.1 cm-0.5 cm, but is not limited by the present disclosure. Space between the shielding layer 33 and the plurality of peripheral connection wires 35 can be adjusted according to the design requirement for the touch device 3.

The laminating mode and manufacturing method of the touch device 3 varies according to the different sensing electrode structures 32. In this specification, three kinds of sensing electrode structures 32 and manufacturing methods thereof are illustrated, but are not limited by the present disclosure.

Figure 6:
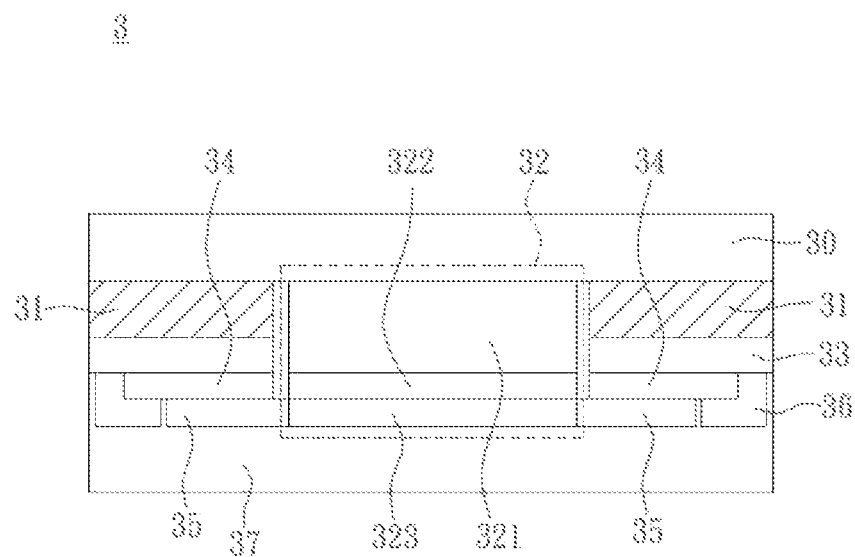
FIG. 6 is a sectional view of a touch device in accordance with an embodiment of the present disclosure.

Laminating mode of the first kind of sensing electrode structure 32 is illustrated in FIGS. 6 to 10. FIG. 6 is a sectional view of a touch device in accordance with an embodiment of the present disclosure; FIG. 7A is a schematic view of a electrode pattern layer 321 and a shielding layer 33 of a touch device in accordance with an embodiment of the present disclosure. The sensing electrode structure of the touch device 3 comprises an electrode pattern layer 321, a second insulation element 322, and a plurality of conductive jumpers 323. The electrode pattern layer 321 can be made of a good conductive material such as a metal or an ITO (indium tin oxide). The electrode pattern layer 321 in the present embodiment comprises conductive structures along two axes (X-axis and Y-axis), namely a plurality of mutually independent first-axis (X-axis) conductive cells and second-axis (Y-axis) conductive cells, wherein only the second-axis (Y-axis) conductive cells are mutually connected along the axis (Y-axis).

Figure 7A:
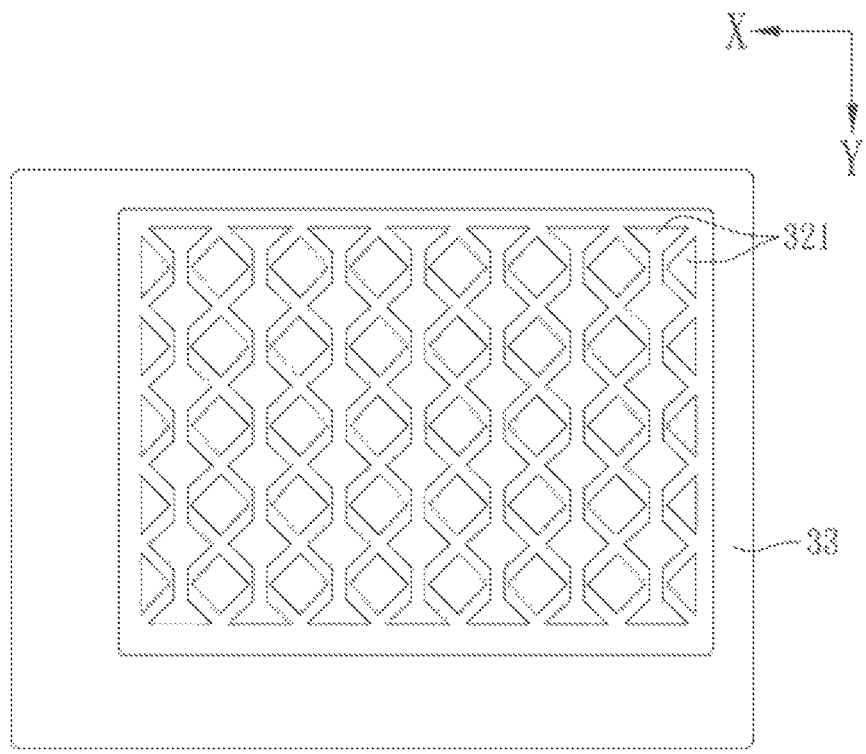
FIG. 7A is a schematic view of an electrode pattern layer and a shielding layer of a touch device in accordance with an embodiment of the present disclosure.
Figure 7B:
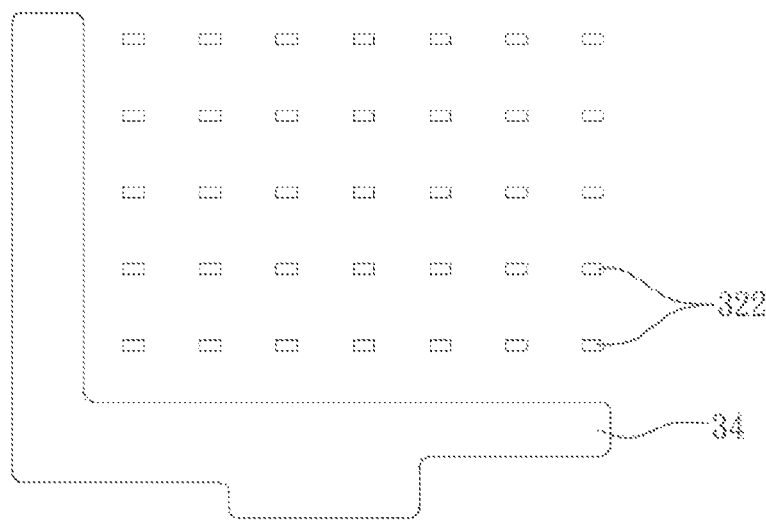
FIG. 7B is a schematic view of a first insulation element and a second insulation element of a touch device in accordance with an embodiment of the present disclosure.

FIG. 7B is a schematic view of a first insulation element 34 and a second insulation element 322 of a touch device in accordance with an embodiment of the present disclosure. The second insulation element 322 partially covers the electrode pattern layer 321. The first insulation element 34 is located under the shielding layer 33.

Figure 7C:
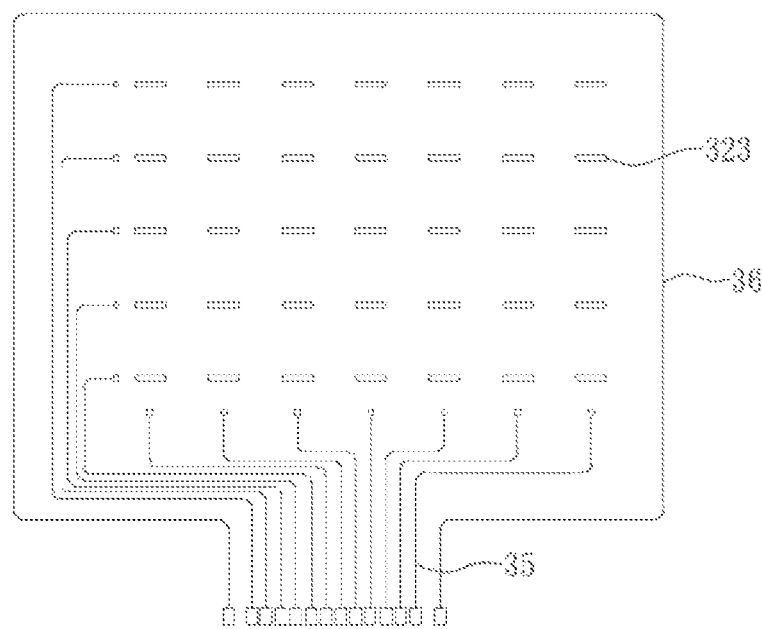
FIG. 7C is a schematic view of a plurality of conductive jumpers, a plurality of peripheral connection wires and a grounding wire of a touch device in accordance with one embodiment of the present disclosure.

FIG. 7C is a schematic view of a plurality of conductive jumpers, a plurality of peripheral connection wires and a grounding wire of a touch device in accordance with an embodiment of the present disclosure. The plurality of conductive jumpers 323 partially cover the second insulation element 322, and the plurality of conductive jumpers 323 further connects the first-axis (X-axis) conductive cells of the electrode pattern layer 321. The plurality of peripheral connection wires 35 are located under the first insulation element 34. The grounding wire 36 is located under the shielding layer 33 and is electrically connected to the shielding layer 33. In the present embodiment, the plurality of conductive jumpers 323 are made of non-transparent metal such as gold, silver or copper, etc., but is not limited by the present disclosure.

Figure 7D:
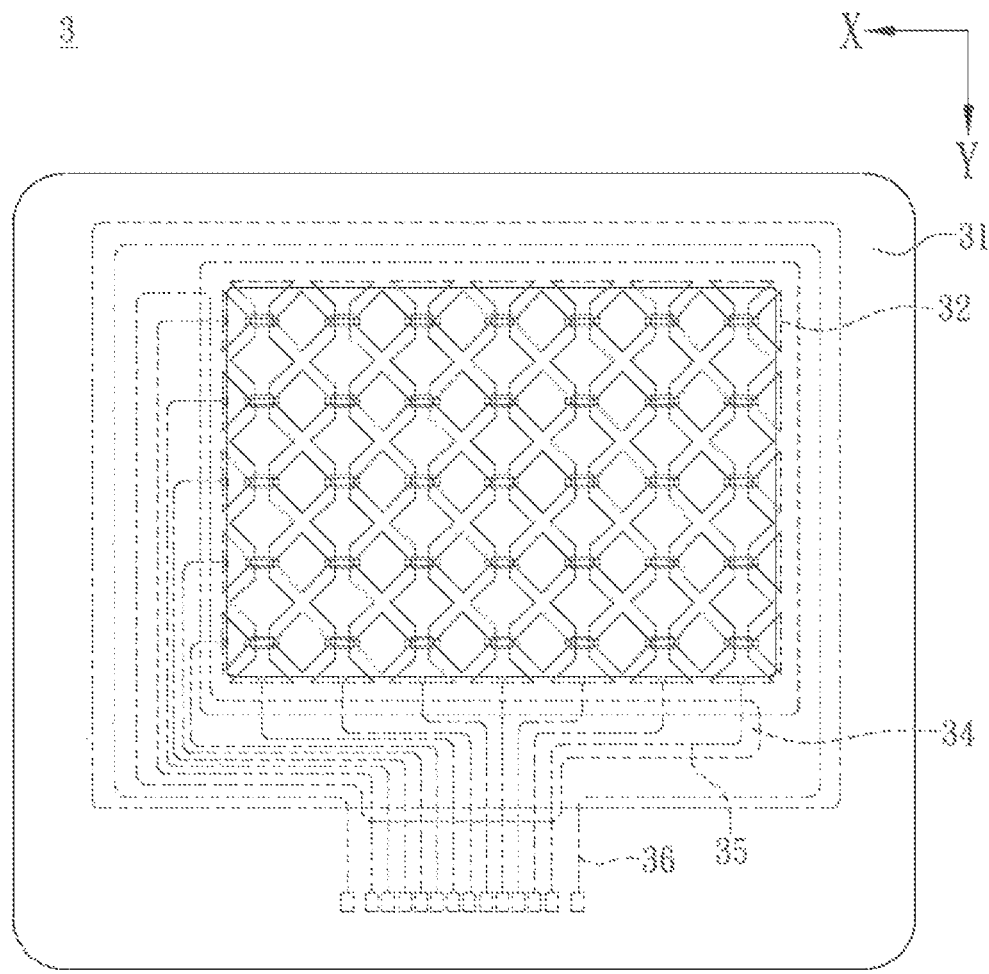
FIG. 7D is a perspective plan view of a touch device in accordance with an embodiment of the present disclosure.

FIG. 7D is a perspective plan view of a touch device in accordance with an embodiment of the present disclosure. The touch device 3 of FIG. 6 is formed by laminating the structures shown in FIG. 5, FIG. 7A and FIG. 7C, and is represented in FIG. 7D. The electrode pattern layer 321, the second insulation element 322, and the conductive jumpers 323 form the sensing electrode structure 32. Moreover, it can be seen from FIG. 7D that the sensing electrode structure 32 of the touch device 3 in the present embodiment comprises sensing electrode structures along two axes (X-axis and Y-axis).

Referring to FIG. 4, in practical applications, the touch device 3 may further comprise a protection layer 37 favorable for subsequent manufacturing and assembling. The insulating protection layer 37 can be formed by photolithographic process, magnetron sputtering, printing or spraying. The insulating protection layer 37 covers the plurality of conductive jumpers 323, the plurality of peripheral connection wires 35 and the grounding wire 36.

Laminating mode of the second kind of sensing electrode structure is to change material of the plurality of conductive jumpers 323 of the sensing electrode structure 32 from non-transparent metal to other transparent conductive material, such as an ITO. The electrode pattern layer 321, the second insulation element 322 and the conductive jumpers 323 can be made of transparent materials such that the sensing electrode structure 32 is transparent.

Figure 8A:
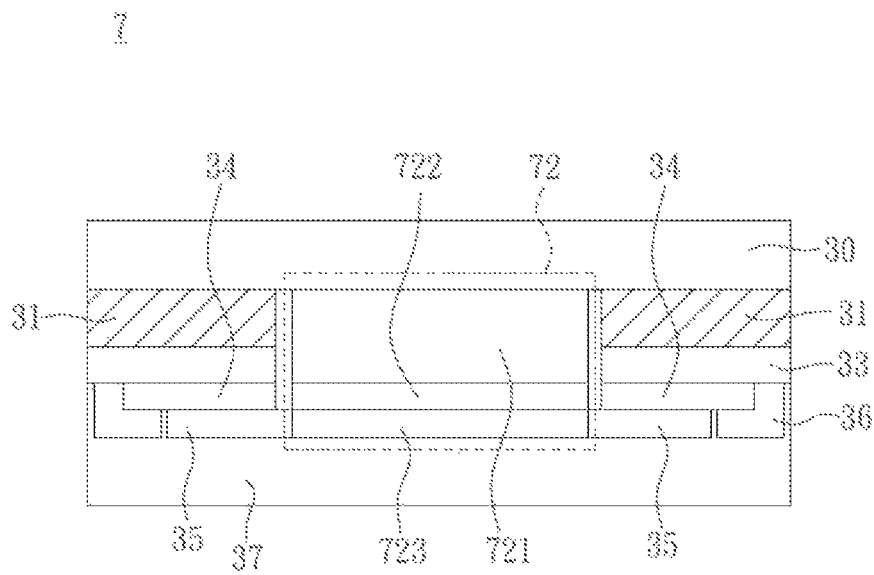
FIG. 8A is a sectional view of a touch device in accordance with another embodiment of the present disclosure.

Laminating mode of the third kind of sensing electrode structure is to form X-axis and Y-axis electrodes on different layers. FIG. 8A is a sectional view of a touch device in accordance with another embodiment of the present disclosure. As shown in FIG. 8A, a sensing electrode structure 72 of a touch device 7 comprises a first-axis electrode pattern layer 721, a second insulation element 722, and a second-axis electrode pattern layer 723.

Figure 8B:
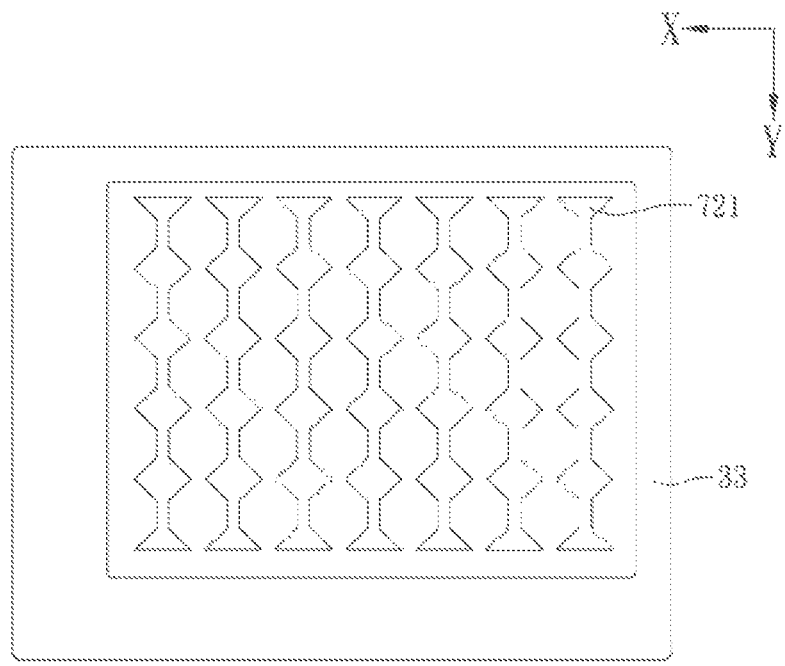
FIG. 8B is a schematic view of a first-axis electrode pattern layer and a shielding layer of a touch device in accordance with another embodiment of the present disclosure.
Figure 8C:
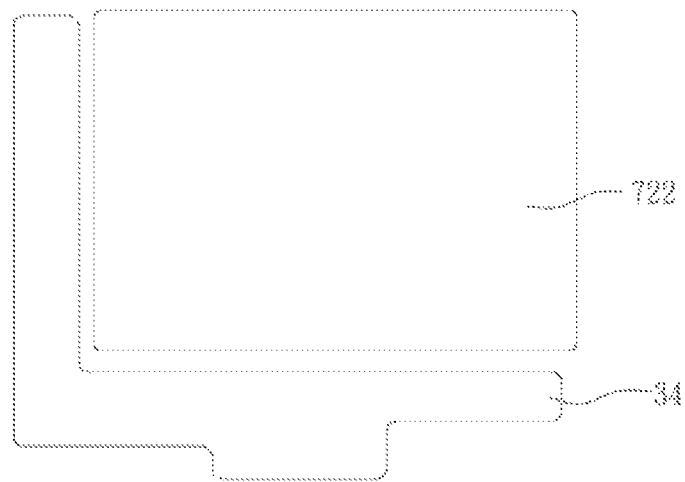
FIG. 8C is a schematic view of a first insulation element and a second insulation element of a touch device in accordance with an embodiment of the present disclosure.
Figure 8D:
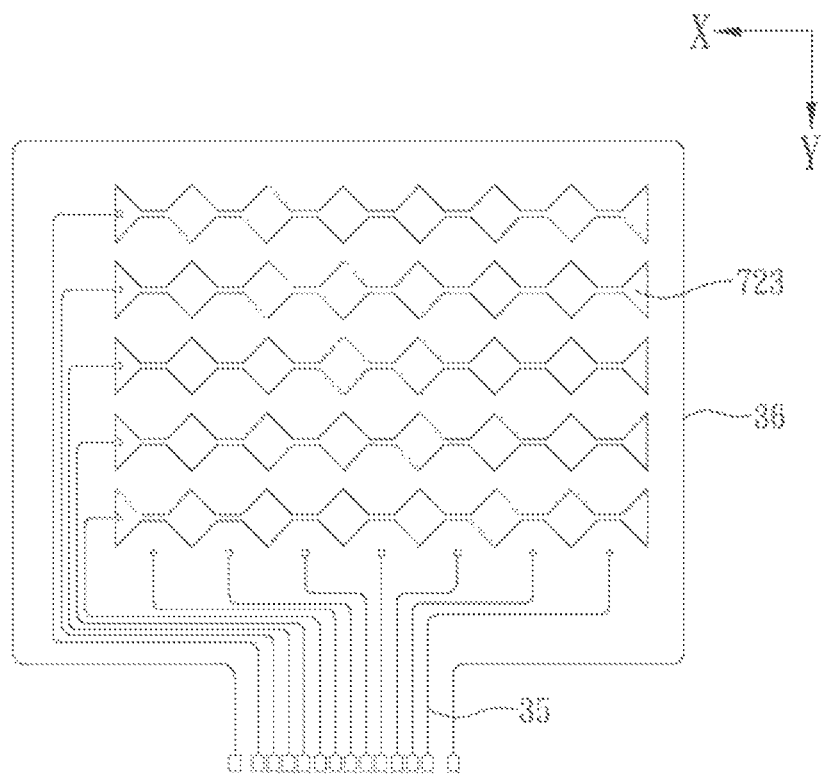
FIG. 8D is a schematic view of a second-axis electrode pattern layer, a plurality of peripheral connection wires and a grounding wire of a touch device in accordance with an embodiment of the present disclosure.
Figure 8E:
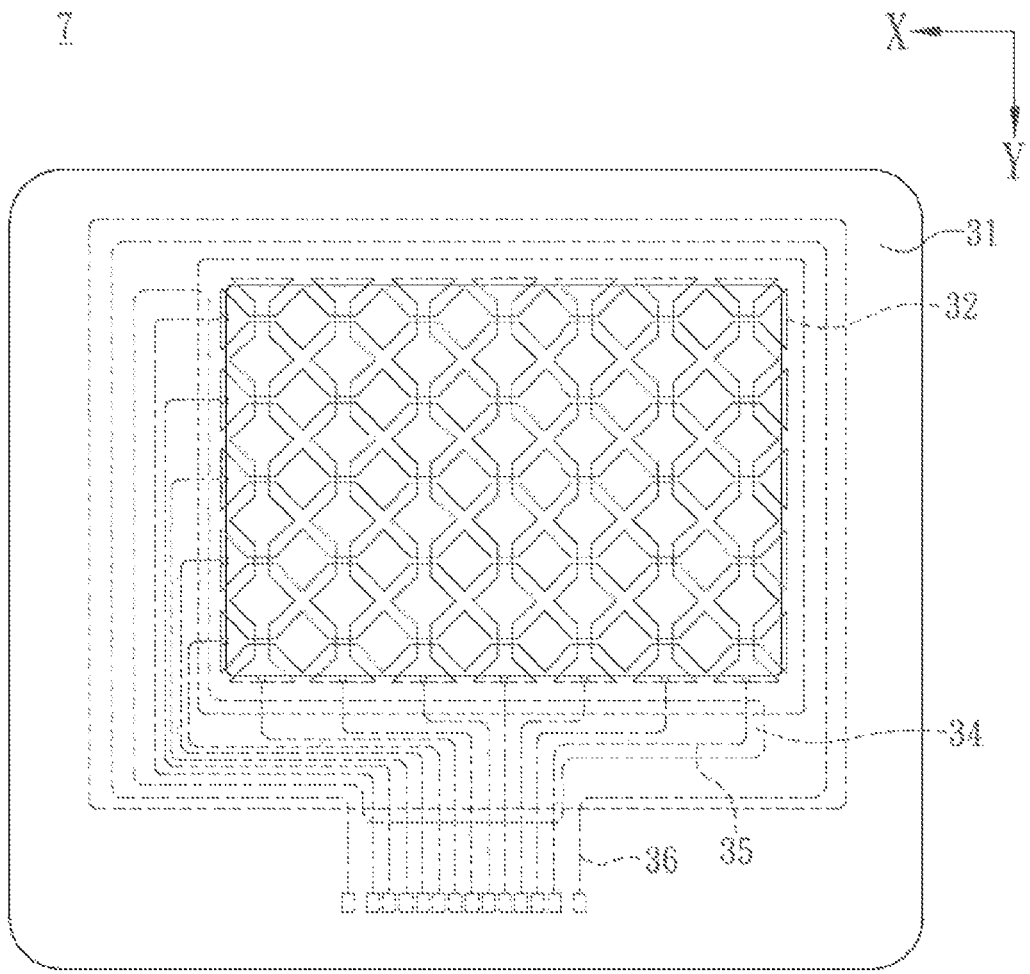
FIG. 8E is a perspective plan view of a touch device in accordance with another embodiment of the present invention.

Referring to FIGS. 8A-8E, the touch device 7 in the present embodiment is identical to the touch device 3 of FIG. 6; wherein the difference lies in the sensing electrode structure. The sensing electrode structure 72 comprises a first-axis electrode pattern layer 721, a second insulation element 722, and a second-axis electrode pattern layer 723. As shown in FIG. 8B, the first-axis electrode pattern layer 721 of the sensing electrode structure 72 is composed of Y-axis electrodes. As shown in FIG. 8D, the second-axis electrode pattern layer 723 is composed of X-axis electrodes. Integration of the first-axis electrode pattern layer 721 and the second-axis electrode pattern layer 723 in the electrode pattern layer 321 is shown in FIG. 7A. The second insulation element 722 of the sensing electrode structure 72 is a complete layer of insulation pattern sandwiched between the first-axis electrode pattern layer 721 and the second-axis electrode pattern layer 723, such that the first-axis electrode pattern layer 721 and the second-axis electrode pattern layer 723 are insulated from each other.

It should be noted that the first-axis electrode pattern layer 721 and the plurality of peripheral connection wires 35 are isolated by the second insulation element 722. In order to electrically connect the first-axis electrode pattern layer 721 and the plurality of peripheral connection wires 35, a plurality of through holes with conductivity can be formed in proper positions of the second insulation element 722. Thus, when laminating the structures shown in FIGS. 8B-8D, the first electrode pattern layer 721 and the plurality of peripheral connection wires 35 can be electrically connected. Those skilled in the art will be able to deduce the other embodiments, so no more details are described hereby. Please refer to the description prior to the present embodiment for other parts of the touch device 7. A method of manufacturing a touch device comprises forming the touch device step by step on a surface of the substrate 30 of FIG. 3, and then inverting the touch device 3 upside down as shown in FIG. 3.

Figure 9:
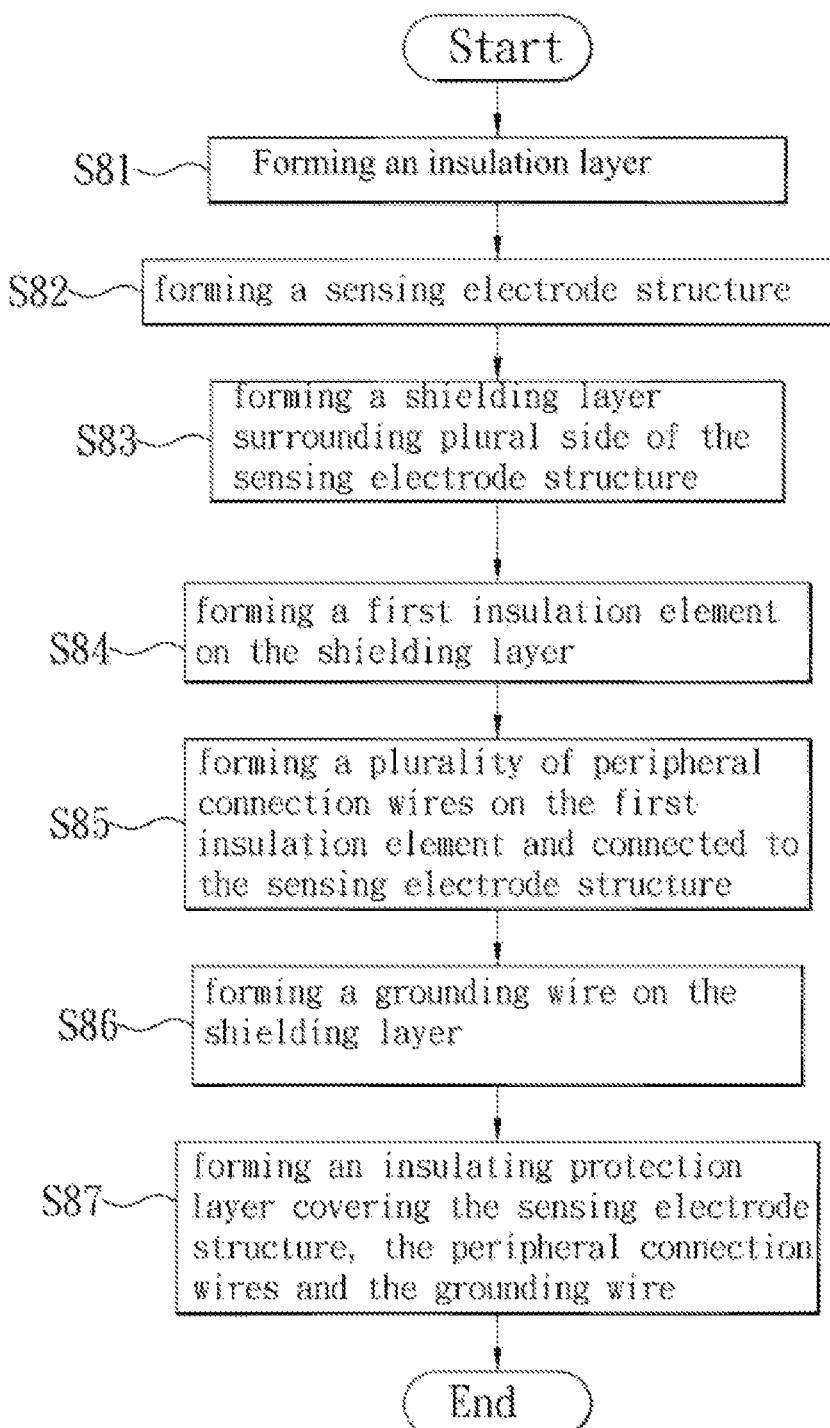
FIG. 9 is a flowchart of a method of manufacturing a touch device in accordance with an embodiment of the present disclosure.

FIG. 9 is a flowchart of a method of manufacturing a touch device in accordance with an embodiment of the present disclosure. The manufacturing method comprises: in step S81: forming an insulation layer 31 on a lower surface of a substrate 30. The substrate 30 can be a bare glass, wherein the bare glass can be further strengthened by a chemical or a physical method. The insulation layer 31 is usually a black mask layer (BM layer) used for preventing light leakage. In step S81, the insulation layer 31 can be completed by a photolithographic process or a printing process.

Step S82: forming a sensing electrode structure 32 on the lower surface of the substrate 30. Step S83: forming a shielding layer 33 surrounding plural sides of the sensing electrode structure 32.

Step S84: forming a first insulation element 34 on the shielding layer 33. Step S85: forming a plurality of peripheral connection wires 35 on the first insulation element 34 and electrically connected to the sensing electrode structure 32. It is seen in step S84 and step S85 that the first insulation element 34 is located between the shielding layer 33 and the peripheral connection wires 35, and the first insulation element 34 is used for isolating the shielding layer 33 from the peripheral connection wires 35 such that the signals transmitted in the plurality of peripheral connection wires 35 are not affected by the charges or currents in the shielding layer 33.

Step S86: forming a grounding wire 36 on the shielding layer 33, which is electrically connected to the shielding layer 33. It should be noted that when the plurality of peripheral connection wires 35 and the grounding wire 36 are made of same conductive material, step S85 and step S86 can be completed in a same process.

Besides, in practical application, the touch device may further comprise a protection layer favorable for subsequent manufacturing and assembling. Thus, after completing step S86, a step S87 can be performed to form an insulating protection layer 37 covering the sensing electrode structure 32, the plurality of peripheral connection wires 35, and the grounding wire 36. The insulating protection layer 37 can be completed by photolithographic process, magnetron sputtering, printing or spraying.

Figure 10:
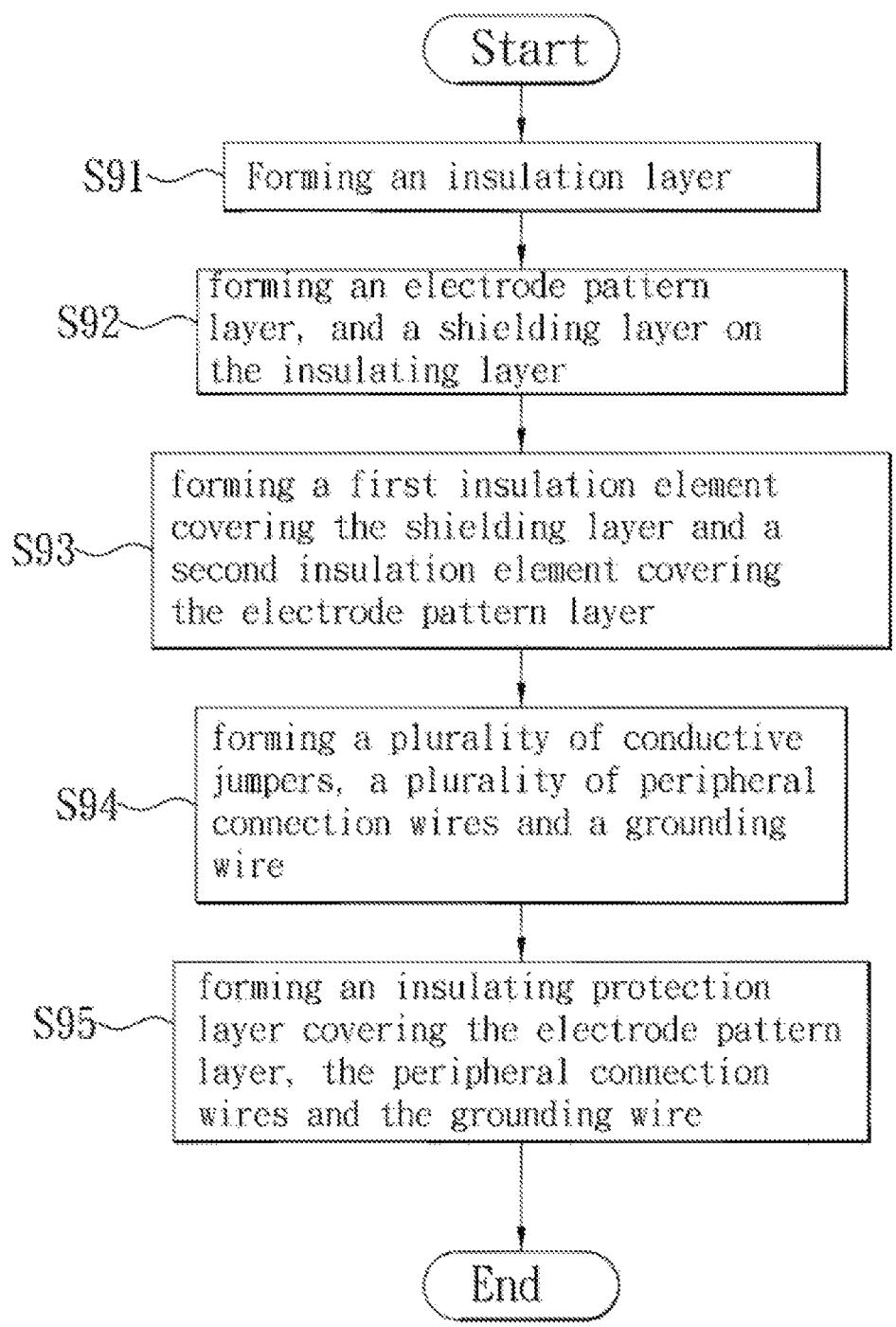
FIG. 10 is a flowchart of a method of manufacturing a touch device in accordance with an embodiment of the present disclosure.

FIG. 10 is a flowchart of a method of manufacturing a touch device in accordance with an embodiment of the present disclosure. According to the sensing electrode structure 32 of FIG. 6, when the plurality of conductive jumpers 323 are made of metal, method of manufacturing the touch device 3 comprises, Firstly, in step S91, an insulation layer 31 is formed on a lower surface of a substrate 30. Step S91 is identical to step S81 as shown in FIG. 9, so no more details are described hereby.

Step S92: forming an electrode pattern layer 321 on the lower surface of the substrate 30, and forming a shielding layer 33 on the insulation layer 31. The electrode pattern layer 321 and the shielding layer 33 can be made of a same material with good conductivity so that they can be formed simultaneously. The electrode pattern layer 321 is a part of the sensing electrode structure 32. For instance, the electrode pattern layer 321 and the shielding layer 33 can be made of ITO (indium tin oxide). In step S92, the electrode pattern layer 321 and the shielding layer 33 are formed either by a photolithographic process or a printing process. Besides, shape of the shielding layer 33 can be the same as that of the insulation layer 31, as shown in FIG. 5, but is not limited by the present disclosure.

Step S93: forming a first insulation element 34 and a second insulation element 322, wherein the first insulation element 34 partially covers the shielding layer 33 and the second insulation element 322 partially covers the electrode pattern layer 321. The second insulation element 322 is a part of the sensing electrode structure 32. In step S93, the first insulation element 34 and the second insulation element 322 can be formed by a photolithographic process or a printing process.

Step S94: forming a plurality of conductive jumpers 323, a plurality of peripheral connection wires 35, and a grounding wire 36, wherein the grounding wire 36 is electrically connected to the shielding layer 33. The plurality of conductive jumpers 323, the plurality of peripheral connection wires 35, and the grounding wire 36 can be made of a same conductive material such that the plurality of conductive jumpers 323, the plurality of peripheral connection wires 35 and the grounding wire 36 can be completed in a same process to reduce manufacturing cost. Step S94: forming a metal conductive layer by magnetron sputtering and then forming the plurality of conductive jumpers 323, the plurality of peripheral connection wires 35, and the grounding wire 36 subsequently by photolithographic process or printing process.

Step S95: forming an insulating protection layer 37 to cover the sensing electrode structure 32, the peripheral connection wires 35, and the grounding wire 36. Step S95 can be identical to step S87 as shown in FIG. 9, so no more details are described hereby.

Figure 11:
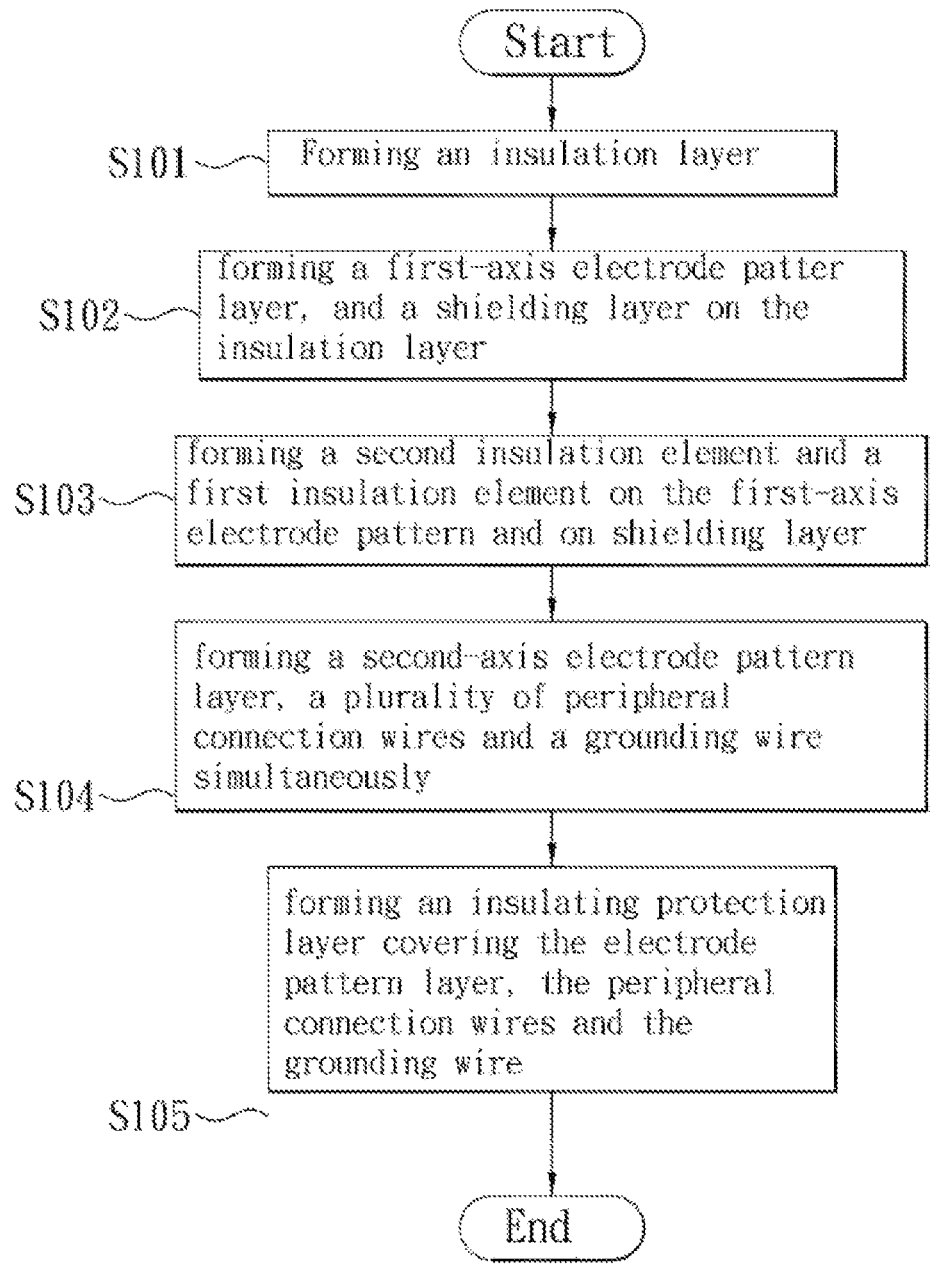
FIG. 11 is a flowchart of a method of manufacturing a touch device in accordance with another embodiment of the present disclosure.

FIG. 11 is a flowchart of a method of manufacturing a touch device in accordance with an embodiment of the present disclosure. Method of manufacturing the touch device 7 of FIG. 8A is shown in FIG. 11. The manufacturing method comprises: first, in step S101, an insulation layer 31 is formed on a lower surface of a substrate 30. Step S101 can be identical to step S81 as shown in FIG. 9, so no more details are described hereby.

Step S102: forming a first-axis electrode pattern layer 721 on the lower surface of the substrate 30, and forming a shielding layer 33 on the insulation layer 31. The first-axis electrode pattern layer 721 and the shielding layer 33 in step S102 can be made of same conductive material such that the first-axis electrode pattern layer 721 and the shielding layer 33 are completed in a same process.

Step S103: forming a second insulation element 722 and a first insulation element 34 on the first-axis electrode pattern layer 721 and on the shielding layer 33, respectively. The second insulation element 722 and the first insulation element 34 can be made of same insulating material such that the second insulation element 722 and the first insulation element 34 are completed in a same process.

Step S104: forming a second-axis electrode pattern layer 723, a plurality of peripheral connection wires 35, and a grounding wire 36 simultaneously, wherein the second-axis electrode pattern layer 723 is located on the second insulation element 722, the plurality of peripheral connection wires 35 are located on the first insulation element 34, and the grounding wire 36 is located on the shielding layer 33, and wherein the grounding wire 36 is electrically connected to the shielding layer 33. The second-axis electrode pattern layer 723, the plurality of peripheral connection wires 35, and the grounding wire 36 can be made of same conductive material such that the second-axis electrode pattern layer 723, the plurality of peripheral connection wires 35 and the grounding wire 36, are completed in a same process.

Step S105: forming an insulating protection layer 37 to cover the sensing electrode structure 72, the peripheral connection wires 35, and the grounding wire 36.

According to the embodiments of the present disclosure, the above-mentioned touch device and the manufacturing method can shield signal interference, and thus the reliability for operation of the sensing electrode structure of the touch device can be improved. Moreover, peripheral connection wires of the touch device can shield or eliminate signal interference, especially a tiny current change caused by a finger touching the connection wires surrounding the touch device. Thus, production quality and yield of the touch device can be improved, and the production cost can further be reduced.

While certain embodiments have been shown and described, various modifications and substitutions may be made thereto without departing from the spirit and scope of the disclosure. Therefore, it is to be understood that the present disclosure has been described by way of illustration purpose only and not limitations.

What is claimed is:

1. A touch device having a touch area and a surrounding area, comprising:
   a sensing electrode structure formed on the touch area;
   a shielding layer formed on the surrounding area, wherein the shielding layer surrounds the sensing electrode structure;
   a first insulation element formed on the surrounding area, wherein the first insulation element is only formed along two adjacent sides of the touch area so that the first insulation element is geometrically shaped in a manner that partially covers the shielding layer;
   a plurality of peripheral connection wires formed on the surrounding area and corresponding to the first insulation element, wherein the first insulation element is formed between the peripheral connection wires and the shielding layer, and the peripheral connection wires are electrically insulated from the shielding layer and are electrically connected to the sensing electrode structure; and
   a grounding wire formed on the surrounding area and electrically connected to the shielding layer;
   wherein the touch area has a plurality of sides, the shielding layer surrounds all of the sides of the touch area, the first insulation element is formed continuously along the two adjacent sides of the sides of the touch area so that the first insulation element partially covers the shielding layer, the peripheral connection wires are substantially formed on the first insulation element in a manner such that the peripheral connection wires are only formed along the two adjacent sides of the sides of the touch area, and the grounding wire surrounds a periphery of the peripheral connection wires.

2. The touch device of claim 1, further comprising:
   a substrate, wherein the sensing electrode structure is located on a lower surface of the substrate, and the shielding layer is entirely formed on the lower surface of the substrate.

3. The touch device of claim 2, further comprising:
   a black mask layer located on the lower surface of the substrate and sandwiched between the substrate and the shielding layer, wherein the black mask layer is formed on the surrounding area and surrounds the touch area.

4. The touch device of claim 1, further comprising:
an insulating protection layer covering surfaces of the sensing electrode structure, the peripheral connection wires, and the grounding wire.

5. The touch device of claim 1, wherein the sensing electrode structure comprises an electrode pattern layer, a second insulation element, and a plurality of conductive jumpers, and wherein the second insulation element is sandwiched between the electrode pattern layer and the conductive jumpers.

6. The touch device of claim 5, wherein the electrode pattern layer comprises a plurality of independent first-axis conductive cells and a plurality of second-axis conductive cells connected along a second axis so as to form a plurality of second-axis sensing structures, and wherein the independent first-axis conductive cells are connected by the conductive jumpers along a first axis to form a plurality of first-axis sensing structures, and wherein the peripheral connection wires comprise a plurality of first-axis peripheral connection wires and a plurality of second-axis peripheral connection wires, and wherein each of the first-axis peripheral connection wires connects to one end of a corresponding first-axis sensing structure, and each of the second-axis peripheral connection wires connects to one end of a corresponding second-axis sensing structure.

7. The touch device of claim 1, wherein the sensing electrode structure comprises a first-axis electrode pattern layer, a second insulation element, and a second-axis electrode pattern layer, wherein the second insulation element entirely covers the first-axis electrode pattern layer such that the first-axis electrode pattern layer is electrically insulated from the second-axis electrode pattern layer.

8. The touch device of claim 7, wherein the first-axis electrode pattern layer comprises a plurality of first electrodes extending along a first axis to form a plurality of first-axis sensing structures and the second-axis electrode pattern layer comprises a plurality of second electrodes extending along a second axis to form a plurality of second-axis sensing structures, and wherein the peripheral connection wires comprise a plurality of first-axis peripheral connection wires and a plurality of second-axis peripheral connection wires, and wherein each of the first-axis peripheral connection wires connects to one end of a corresponding first-axis sensing structure, and each of the second-axis peripheral connection wires connects to one end of a corresponding second-axis sensing structure.

9. A method of manufacturing a touch device having a touch area and a surrounding area, comprising:
forming a sensing electrode structure on the touch area;
forming a shielding layer on the surrounding area, wherein the shielding layer surrounds the sensing electrode structure;
forming a first insulation element on the surrounding area, wherein the first insulation element is only formed along two adjacent sides of the touch area so that the first insulation element is geometrically shaped in a manner that partially covers the shielding layer;
forming a plurality of peripheral connection wires on the surrounding area and corresponding to the first insulation element, wherein the first insulation element is formed between the peripheral connection wires and the shielding layer, and the peripheral connection wires are electrically insulated from the shielding layer and are electrically connected to the sensing electrode structure; and
forming a grounding wire on the surrounding area and electrically connected to the shielding layer;
wherein the peripheral connection wires and the grounding wire are formed simultaneously, and wherein the touch area has a plurality of sides, the shielding layer surrounds all of the sides of the touch area, the first insulation element is formed continuously along the two adjacent sides of the sides of the touch area so that the first insulation element partially covers the shielding layer, the peripheral connection wires are substantially formed on the first insulation element only along the two adjacent sides of the sides of the touch area, and the grounding wire surrounds a periphery of the peripheral connection wires.

10. The method of manufacturing a touch device of claim 9, further comprising:
a substrate, wherein the sensing electrode structure is formed on a lower surface of the substrate, and the shielding layer is entirely formed on the lower surface of the substrate.

11. The method of manufacturing a touch device of claim 10, further comprising:
forming a black mask layer on the lower surface of the substrate, wherein the black mask layer is sandwiched between the substrate and the shielding layer, and wherein the black mask layer is formed on the surrounding area and surrounds the touch area.

12. The method of manufacturing a touch device of claim 9, wherein the sensing electrode structure comprises an electrode pattern layer, a second insulation element, and a plurality of conductive jumpers, and wherein the electrode pattern layer and the shielding layer are formed simultaneously, and wherein the second insulation element and the first insulation element are formed simultaneously.

13. The method of manufacturing a touch device of claim 12, wherein the conductive jumpers, the peripheral connection wires, and the grounding wire are made of a same material and formed simultaneously.

14. The method of manufacturing a touch device of claim 9, wherein the sensing electrode structure comprises a first-axis electrode pattern layer, a second insulation element, and a second-axis electrode pattern layer, and wherein the first-axis electrode pattern layer and the shielding layer are formed simultaneously, and wherein the second insulation element and the first insulation element are formed simultaneously, and wherein the second insulation element entirely covers the first-axis electrode pattern layer so that the first-axis electrode pattern layer is electrically insulated from the second-axis electrode pattern layer.

15. The method of manufacturing a touch device of claim 14, wherein the second-axis electrode pattern layer, the peripheral connection wires, and the grounding wire are made of a same material and formed simultaneously.

16. The method of manufacturing a touch device of claim 9, further comprising:
forming an insulating protection layer to cover the sensing electrode structure, the peripheral connection wires, and the grounding wire.

17. A touch device having a touch area and a surrounding area, comprising:
a sensing electrode structure formed on the touch area;
a shielding layer formed on the surrounding area, wherein the shielding layer surrounds the sensing electrode structure;
a first insulation element formed on the surrounding area, wherein the first insulation element is only formed along two adjacent sides of the touch area so that the first insulation element is geometrically shaped in a manner that partially covers the shielding layer and the first insulation element is formed continuously along the two adjacent sides of the touch area;

a plurality of peripheral connection wires formed on the surrounding area and corresponding to the first insulation element, wherein the first insulation element is formed between the peripheral connection wires and the shielding layer, and the peripheral connection wires are electrically insulated from the shielding layer and are electrically connected to the sensing electrode structure; and a grounding wire formed on the surrounding area and electrically connected to the shielding layer;

wherein the shielding layer having a first section and a second section surrounds the touch area, the first insulation element is formed to cover the first section of the shielding layer, the peripheral connection wires are substantially formed on the first insulation element, the second section of the shielding layer is exposed from the first insulation element and the peripheral connection wires, and the grounding wire surrounds a periphery of the peripheral connection wires.

* * * * *